United States Patent

Del Signore, II et al.

(10) Patent No.: US 7,019,583 B2
(45) Date of Patent: Mar. 28, 2006

(54) CURRENT INRUSH LIMITING CIRCUIT

(75) Inventors: James R. Del Signore, II, Trumansburg, NY (US); Steven M. Spano, Ithaca, NY (US); Randolph Bullock, Dryden, NY (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 0 days.

(21) Appl. No.: 09/770,478

(22) Filed: Jan. 29, 2001

(65) Prior Publication Data

US 2002/0176216 A1 Nov. 28, 2002

(51) Int. Cl.
G05F 1/10 (2006.01)
G05F 3/02 (2006.01)

(52) U.S. Cl. .................. 327/538; 327/108; 327/170; 323/908

(58) Field of Classification Search ............. 327/108, 327/170, 538, 540, 541, 543; 323/908
See application file for complete search history.

(56) References Cited

U.S. PATENT DOCUMENTS

| | | | |
|---|---|---|---|
| 4,494,064 A | 1/1985 | Harkness | 323/277 |
| 4,631,470 A | 12/1986 | Bingley | 323/282 |
| 5,272,584 A | 12/1993 | Austruy et al. | 361/58 |
| 5,283,707 A | 2/1994 | Conners et al. | 361/58 |
| 5,374,887 A | 12/1994 | Drobnik | 323/299 |
| 5,519,264 A | 5/1996 | Heyden et al. | 307/125 |
| 5,519,656 A * | 5/1996 | Maccarrone et al. | 365/189.09 |
| 5,557,193 A * | 9/1996 | Kajimoto | 323/266 |
| 5,572,395 A | 11/1996 | Rasums et al. | 361/58 |
| 5,703,769 A | 12/1997 | Murray | 363/50 |
| 5,818,212 A * | 10/1998 | Min et al. | 323/314 |
| 5,828,245 A * | 10/1998 | Brambilla et al. | 327/108 |
| 5,991,175 A | 11/1999 | Liu | 363/56.1 |
| 6,150,800 A * | 11/2000 | Kinoshita et al. | 323/274 |

FOREIGN PATENT DOCUMENTS

JP    10293617 A  *  11/1998

* cited by examiner

Primary Examiner—Terry D. Cunningham
Assistant Examiner—Quan Tra
(74) Attorney, Agent, or Firm—George R. McGuire; Bond, Schoeneck and King, PLLC

(57) ABSTRACT

An inrush circuit for electronic devices is particularly useful for point-of-sale printers. The circuit applies an active feedback-controlled voltage ramp to a bulk capacitor by means of a P-channel field effect transistor that is operated linearly after a controlled delay for contact bounce.

10 Claims, 2 Drawing Sheets

CURRENT INRUSH LIMITING CIRCUIT

FIELD OF THE INVENTION

The present invention relates to circuits for limiting hot-plug or DC-side power switched inrush current and, more particularly, to an inrush limiting circuit that comprises four subsystems that cooperate with each other to effectively eliminate large inrush currents regardless of the cycle time of the device being powered or its input capacitance.

BACKGROUND OF THE INVENTION

Circuit boards, or devices containing large power supply bulk capacitance, experience an uncontrolled initial inrush current that charges the capacitance when power is initially applied. This inrush current can cause damage to components, system disruption or permanent failure thereof.

Recent tests have shown that various point-of-sale (POS) printers have inrush current that is not properly limited. Often, attempts to resolve the problem have been primitive, and have been only marginally successful. In addition, many of these previous attempts to deal with this problem have been expensive. It is not uncommon to experience disturbances or terminal resets when POS printers are connected to a POS terminal while it is powered up.

In some cases, an inrush transient may exceed thirty amperes, while the peak capacity of the supply is typically twelve amperes or less. An inrush circuit for a high-speed thermal POS receipt printer must present less than ten amperes peak inrush, and be capable of providing normal operation with peak current draw of up to twelve amperes.

DISCUSSION OF RELATED ART

Inrush current limiting has been attempted using a two-step connection scheme. The two-step scheme comprises a first step applied through either a resistor or NTC thermistor device, and a second step that shunts the first device with a low impedance path. The shunting can be accomplished with either field effect transistors (FETs) or silicon control rectifiers (SCRs), as illustrated in U.S. Pat. No. 5,519,264. This method has the disadvantage of added cost of the resistor or thermistor that must pass the inrush current. Such a scheme is also limited by long turn-on delays, in order to ensure safe operation of the system. This has been found necessary, due to the uncertainty of the actual charge state of the bulk capacitor over time. Such schemes are also limited to situations where exact capacitor value is known.

Another common approach to the problem has been to sense the current with a resistor shunt and use a DC current feedback control to modulate the power control device, as shown in U.S. Pat. Nos. 5,572,395, 4,494,064 and 5,991,175. While this approach can work better over a greater parts variation, than do delay circuits, it requires the addition of a current sensing resistor that reduces the load regulation of the system.

Others have applied various ramps to the gate of a power control FET, as illustrated in U.S. Pat. Nos. 4,631,470, 5,283,707, 5,374,887 and 5,703,769. These approaches seek to gain some degree of control of the rate of rise of output voltage, and thus seek to control the inrush current presented to the supply.

These schemes are limited by the large variation in turn-on behavior of the FET. The output voltage is not linear with ramp voltage, nor is the current output, when the ramp is applied to the gate of the FET. These applied ramps are generally derived from an RC exponential decay. Upon reaching the threshold, unless the gate ramp is slowed suddenly, the device switches from OFF to ON in short order. This limits any attempt to control this action. Extremely long gate time constants have been tried to remedy this situation.

One scheme that is similar to that of this invention is shown in the U.S. Pat. No. 5,272,584. This approach uses the same linear, closed-loop control of the power device, while delivering a controlled ramp to the load. However, this circuit is limited for use with supply-side protection of hot-plugged cards, such as PCMCIA. By contrast, the present invention deals with the load side. Furthermore, the aforementioned patent uses an auxiliary control line to trigger the ramp onset, prior to which nothing happens during insertion of the card. This feature is probably necessary for ensuring full insertion of the PC-card prior to power-up, but is totally unnecessary in the present invention.

SUMMARY OF THE INVENTION

In accordance with the present invention, there is provided a circuit for limiting hot-plug or DC-side power switched inrush current into electronic devices having high input capacitance. The circuit applies an active feedback-controlled voltage ramp to a bulk capacitor by means of a P-channel field effect transistor that is operated linearly after a controlled delay for contact bounce. Linear output voltage ramp to the load capacitor is ensured by providing active control of the gate voltage, via an operational amplifier with voltage feedback. The ramp is generated by an RC network, but only the first third of the exponential is used, wherein the waveshape is quite linear and approaches that of an ideal ramp. Since a voltage ramp applied to a capacitor implies constant current, the inrush current is controlled to the extent that the ramp is linear. To ensure the initial state is OFF, and the final state is Full-On, gain is applied in the feedback loop, wherein the reference voltage ramp drives the FET via the op amp. This feedback loop is compensated against spurious oscillation. The circuit is operative over a large range of component tolerances. The circuit is inexpensive, compared to previous designs. It provides for improved control over the inrush period, reduced charging time, and tolerance for wide ranges of load capacity, while assuring very low ON impedance for normal operation. The circuit does not false-trigger an inrush cycle with load transients. Once connected successfully, the power management is controlled by the product firmware.

It is an object of this invention to provide an improved inrush circuit for electronic devices having high input capacitance.

It is another object of the invention to provide an inrush circuit for point-of-sale printers that is inexpensive and that has low ON impedance during normal operation.

It is a further object of this invention to provide an inrush circuit for electronic devices that has reduced charging time and displays a tolerance for wide ranges of load capacity.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features an inrush circuit for electronic devices and, in particular, an inrush circuit for point-of-sale printers. The circuit limits hot-plug or DC-side power switched inrush current into devices having high input capacitance. The circuit applies an active feedback-controlled voltage ramp to a bulk capacitor by means of a P-channel field effect transistor that is operated linearly after a controlled delay for contact bounce. Linear output voltage ramp to the load capacitor is ensured by providing active control of the gate voltage, via an operational amplifier with voltage feedback. The ramp is generated by an RC network, but only the first third of the exponential is used, wherein the waveshape is linear and approaches that of an ideal ramp. Since a voltage ramp applied to a capacitor implies constant current, the inrush current is controlled to the extent that the ramp is linear.

Figure 1:
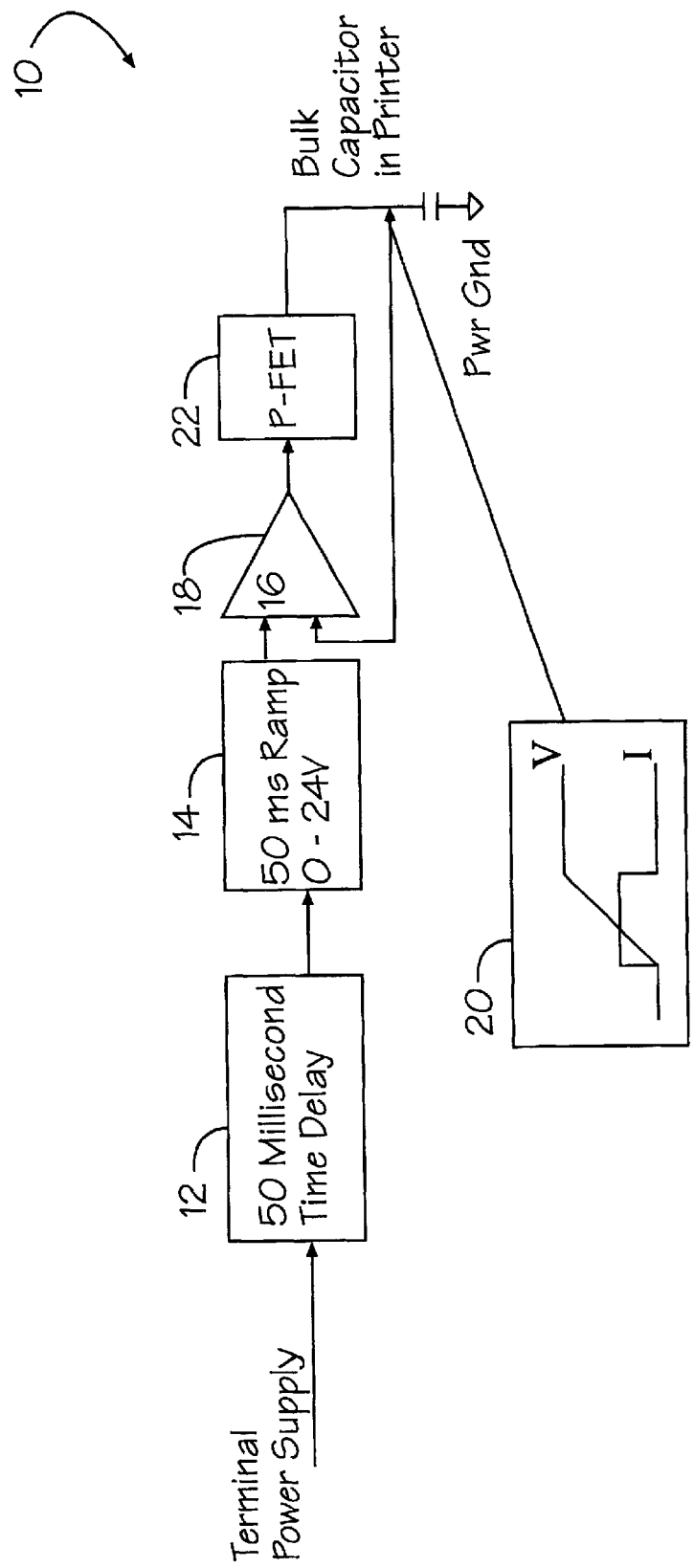
FIG. 1 illustrates a block diagram of the circuit of this invention.

Now referring to FIG. 1, a block diagram of the inrush limiting circuit 10 of this invention is shown. The current inrush limiting circuit 10 is composed of four subsystems:

1) A time delay 12 to eliminate false action during contact bounce.

2) A voltage ramp 14 applied to the reference input 16 of an operational amplifier circuit 18.

3) An operational amplifier circuit 18 to compare a divided sample of the output voltage 20 to the ramp input 16, and to operate in a linear mode, causing the output voltage 20 to approximate the input ramp multiplied by a gain of two.

4) A power field effect transistor (P-FET) 22 to act in linear mode during capacitor charging, and then go to a low-impedance (full-ON) state, in order to convey the full power supply capacity to the load during normal operation.

These four subsystems work together to effectively eliminate large inrush currents, regardless of the cycle time of the powered printer or its input capacitance.

The circuit 10 cannot be triggered by current peaks presented during normal operation, and does not interfere with power delivery to the load, after the power-up cycle is complete. The circuit 10 resets itself long before normal power draw would deplete the bulk capacitance, if power is briefly interrupted. Therefore, the circuit 10 is ready to recover safely whenever power comes back.

The heart of the circuit 10 is the voltage ramp 14 applied to a linear feedback circuit, which forces the P-FET 22 to produce a matching voltage ramp upon the output bulk capacitor of FIG. 1, guaranteeing constant current until the capacitor is charged. Thereafter, it saturates to a low ON-state, which is limited only by Rds-ON of the P-FET 22. Changes of output load capacitance affect only the value of current during charging, and not the ability to limit its operation.

Repeated operation of the circuit 10 at any repetition rate has no adverse effect, since no temperature-dependent parts are used.

There is no setting of timing between separate, unrelated events, since there is a single current path. The two processes that operate this system are sequential, with the second enabled by the completion of the first. The time delay is added to eliminate the possibility of undesired operation during the action of inserting the connector into the power source or printer jack. This addition is with virtually no added cost, and acts as further insurance.

Figure 2:
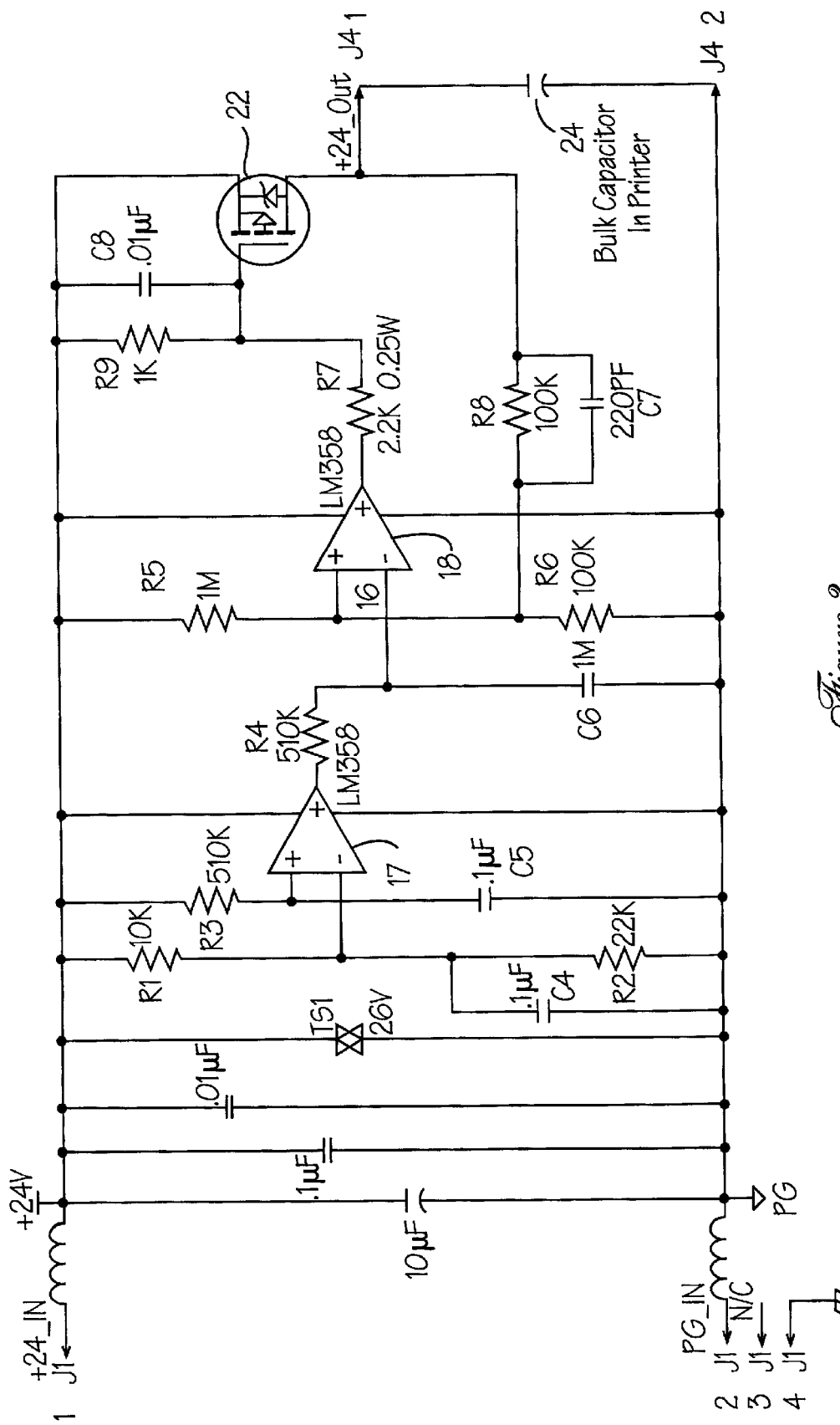
FIG. 2 depicts a more detailed diagram of the circuit of the invention.

Referring to FIG. 2, the circuit 10 of FIG. 1 is shown in greater detail. The resistors R1 and R2 and capacitor C4 establish a reference against which resistor R3 and capacitor C5 charge, reaching threshold at about 50 ms. Operational amplifier 17 switches from low to high, raising voltage applied to resistor R4 and starting the ramp at capacitor C6.

Capacitor C8 ensures that the field effect transistor 22 starts-up OFF. Capacitor C8 is minimized to prevent subsequent interference in the linear feedback loop. In addition, resistors R5, R6 and R8 ensure that the initial voltage at positive input of op-amp 18 is a positive value, which forces the output high, until the ramp begins.

The effective output "ramp" is that of the input multiplied by two, since resistors R6 and R8 form approximately a 2:1 divider. This forces the FET 22 drive to start out fully OFF, and end up fully ON, in addition to limiting the portion of the actual ramp that is used, for improved linearity.

Capacitor C7 and resistor R8 compensate the operational amplifier 18, against oscillation in the linear region of operation. The values chosen for resistors R7 and R9 insure deep saturation of the FET 22, while protecting the gate voltage rating.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention:

Having thus described the invention, what is desired to be protected by Letters Patent is presented in the subsequently appended claims.

What is claimed is:

1. An inrush circuit for electronic devices having high input capacitance, said inrush circuit comprising:

a. means for providing a voltage ramp;

b. means defining an output voltage;

c. an operational amplifier circuit having a reference input, said operational amplifier circuit receiving said voltage ramp at said reference input and comparing a divided sample of said output voltage with the voltage ramp, said operational amplifier operating in a linear mode, whereby said output voltage approximates a multiple of the voltage ramp;

d. transistor means electronically connected to said operational amplifier circuit, said transistor means operating in linear mode during capacitor charging, and subsequently reaching a full-ON state; and e. energy storage load means connected to said transistor means for receiving a full power supply after said transistor means reaches its said full-ON state.

2. The inrush circuit for electronic devices in accordance with claim 1, wherein said transistor means comprises a power field effect transistor.

3. The inrush circuit for electronic devices in accordance with claim 1, wherein said output voltage approximates the voltage ramp by a gain of two.

4. The inrush circuit for electronic devices in accordance with claim 1, wherein said electronic devices comprise a point-of-sale printer.

5. The inrush circuit for electronic devices in accordance with claim 2, wherein said field effect transistor is operative initially in an OFF state, and subsequently becomes operative in a full-ON state.

6. The inrush circuit for electronic devices in accordance with claim 5, wherein said field effect transistor is part of a linear feedback loop, and further comprising capacitive means electronically connected to said field effect transistor for ensuring that said field effect transistor is initially operative in said OFF state, said capacitive means being minimized to subsequently prevent interfering with said linear feedback loop.

7. The inrush circuit for electronic devices in accordance with claim 2, further comprising capacitive means electronically connected to said operational amplifier for preventing oscillation thereof.

8. The inrush circuit of claim 1, further comprising time delay means connected to said means for providing a voltage ramp.

9. The inrush circuit of claim 8, wherein said time delay means reaches threshold in about 50 ms.

10. The inrush circuit of claim 1, wherein said energy storage load means is a bulk capacitor.

\* \* \* \* \*